United States Patent
Takahashi

(10) Patent No.: US 9,667,102 B2
(45) Date of Patent: May 30, 2017

(54) WIRELESS ELECTRIC POWER TRANSMISSION APPARATUS, METHOD FOR CONTROLLING WIRELESS ELECTRIC POWER TRANSMISSION APPARATUS, AND STORAGE MEDIUM

(71) Applicant: CANON KABUSHIKI KAISHA, Tokyo (JP)

(72) Inventor: Naoto Takahashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 482 days.

(21) Appl. No.: 14/252,617

(22) Filed: Apr. 14, 2014

(65) Prior Publication Data

US 2014/0312708 A1  Oct. 23, 2014

(30) Foreign Application Priority Data

Apr. 19, 2013 (JP) ................. 2013-088495

(51) Int. Cl.

| | |
|---|---|
| *H01F 27/42* | (2006.01) |
| *H01F 37/00* | (2006.01) |
| *H01F 38/00* | (2006.01) |
| *H02J 17/00* | (2006.01) |
| *H02J 50/60* | (2016.01) |
| *H02J 50/80* | (2016.01) |
| *H02J 5/00* | (2016.01) |
| *H02J 7/02* | (2016.01) |

(52) U.S. Cl.
CPC ............. *H02J 17/00* (2013.01); *H02J 5/005* (2013.01); *H02J 50/60* (2016.02); *H02J 50/80* (2016.02); *H02J 7/025* (2013.01)

(58) Field of Classification Search
CPC .. H02J 5/005; H02J 7/025; H02J 17/00; H02J 50/60; H02J 50/80; H01F 38/14
USPC ........................................... 307/104
See application file for complete search history.

(56) References Cited

U.S. PATENT DOCUMENTS

2009/0001932 A1\*  1/2009  Kamijo .................. H02J 5/005
                                                              320/108

FOREIGN PATENT DOCUMENTS

| JP | P2003-79076 A | 3/2003 |
|---|---|---|
| JP | 2006019788 A | 1/2006 |
| JP | 2009011129 A | 1/2009 |
| JP | 2009219177 A | 9/2009 |
| JP | 2009273219 A | 11/2009 |
| JP | P2011-30299 A | 2/2011 |
| JP | 2011152008 A | 8/2011 |

(Continued)

*Primary Examiner* — Carlos Amaya
(74) *Attorney, Agent, or Firm* — Canon U.S.A., Inc. IP Division

(57) ABSTRACT

A wireless electric power transmission apparatus includes a communication unit configured to carry out communication for wireless electric power transmission, a restriction unit configured to restrict the wireless electric power transmission in a case in which the communication unit is unable to communicate with an object disposed within a range in which the wireless electric power transmission apparatus can transmit the wireless electric power, and a control unit configured to start the wireless electric power transmission in response to a user instruction in a case in which the communication unit is unable to communicate with the object disposed within the range in which the wireless electric power transmission apparatus can transmit wireless electric power.

11 Claims, 7 Drawing Sheets

(56) References Cited

FOREIGN PATENT DOCUMENTS

| JP | 2012010524 A | 1/2012 |
| JP | P2012-251374 A | 12/2012 |
| WO | 2009/014125 A1 | 1/2009 |

* cited by examiner

PUSH BUTTON SWITCH

SEESAW SWITCH, SLIDE SWITCH

FIG. 6A

FOREIGN OBJECT
HAS BEEN PLACED.

FIG. 6B

DO YOU WANT TO START
ELECTRIC POWER CHARGE?

FIG. 6C

FOREIGN OBJECT
HAS BEEN PLACED.
DO YOU WANT TO START
ELECTRIC POWER CHARGE?

FIG. 6D

OBJECT HAS BEEN DETECTED.
BUT COMMUNICATION CANNOT
BE ESTABLISHED.
PLEASE CHECK TO SEE
WHETHER THE OBJECT IS
FOREIGN OBJECT.
IF YOU WANT TO START
CHARGING THE APPARATUS
PLACED ON THE ELECTRIC
POWER TRANSMISSION APPARATUS,
PLEASE OPERATE THE SWITCH.
WHEN YOU OPERATE THE SWITCH,
PLEASE REMOVE OBJECT OTHER
THAN THE APPARATUS TO BE
CHARGED FROM THE ELECTRIC
POWER TRANSMISSION APPARATUS.

FIG. 6E

PLEASE REMOVE FOREIGN
OBJECT

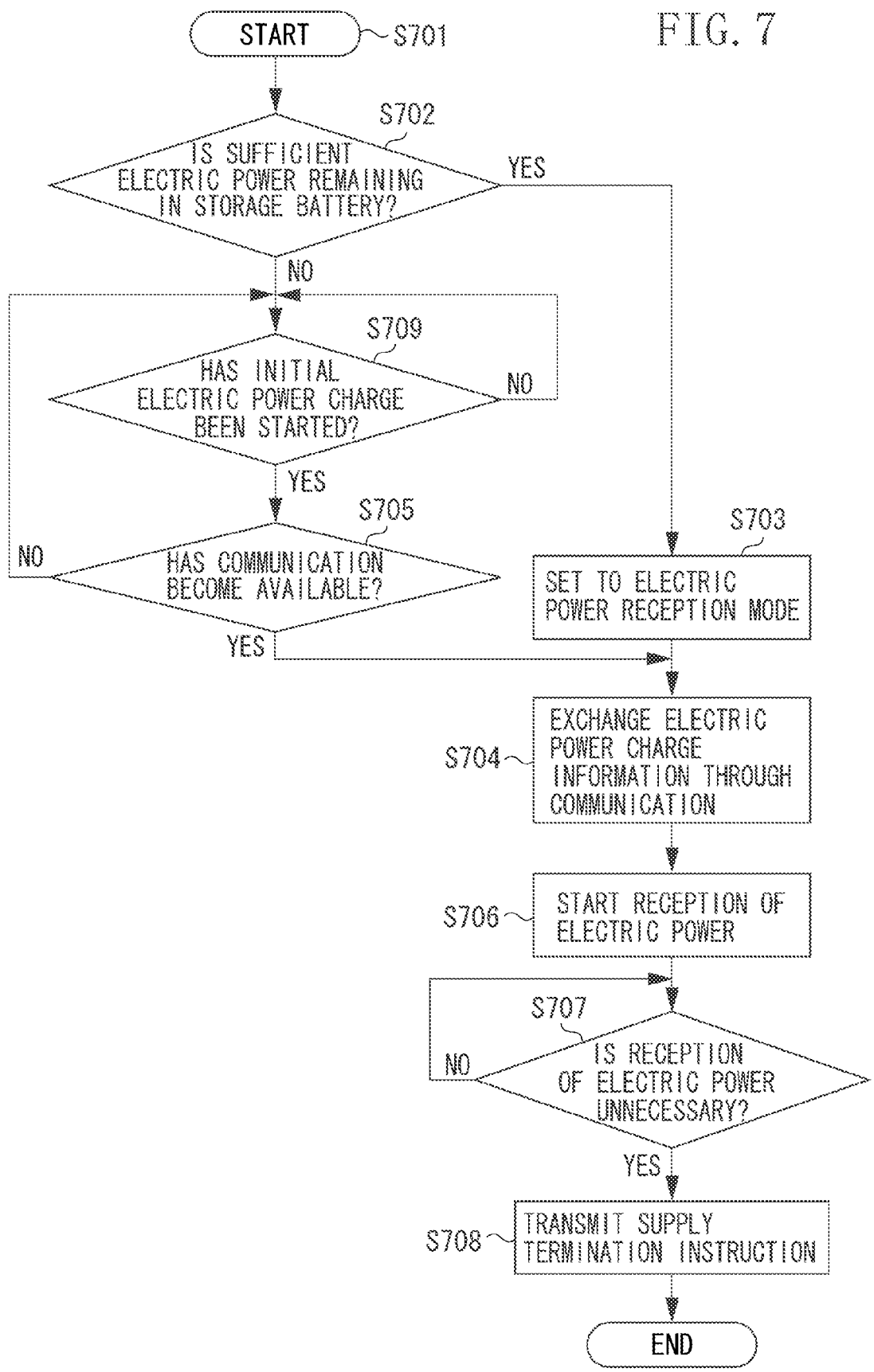

WIRELESS ELECTRIC POWER TRANSMISSION APPARATUS, METHOD FOR CONTROLLING WIRELESS ELECTRIC POWER TRANSMISSION APPARATUS, AND STORAGE MEDIUM

BACKGROUND

Field

The present subject matter relates to wireless electric power transmission.

Description of Related Art

Nowadays, a wireless electric power transmission system is known that includes an electric power transmission apparatus which wirelessly (contactlessly) transmits electric power, and an electric power reception apparatus which receives the electric power supplied from the electric power transmission apparatus, without being interconnected through a connector. According to Japanese Laid-Open Patent Application No. 2012-251374, a key that wirelessly locks and unlocks a door of an automobile is provided with a switch for instructing an electric power transmission apparatus to start transmitting electric power.

In a case in which an object (e.g., a foreign object such as a conductor) that does not support wireless electric power transmission is placed within a range in which the electric power transmission apparatus can transmit wireless electric power, there may arise a problem in which the object generates heat. A conceivable countermeasure against such a problem is to find, through communication, whether the object placed within the range in which the electric power transmission apparatus can transmit wireless electric power supports wireless electric power transmission. In a case in which a remaining battery capacity of an electric power reception apparatus is too low to carry out such communication, however, the electric power transmission apparatus cannot establish communication with the electric power reception apparatus and may determine that the electric power reception apparatus is a foreign object, and thus the electric power reception apparatus may not start charging.

It is possible to give instructions for starting wireless electric power transmission based on a user operation according to Japanese Laid-Open Patent Application No. 2012-251374. However, wireless electric power transmission disadvantageously starts even in a case in which the user fails to notice that a foreign object that does not support wireless electric power transmission is present within a range that enables the wireless electric power transmission. Thus, there is room for improvement in such a conventional technique. Namely, in terms of achieving both safety in wireless electric power transmission and convenience in starting wireless electric power transmission even in a case in which the remaining battery capacity of the electric power reception apparatus is low, for example.

SUMMARY

According to an aspect of the present subject matter, a wireless electric power transmission apparatus includes a communication unit configured to carry out communication for wireless electric power transmission, a restriction unit configured to restrict the wireless electric power transmission in a case in which the communication unit is unable to communicate with an object disposed within a range in which the wireless electric power transmission apparatus can transmit wireless electric power, and a control unit configured to start the wireless electric power transmission in response to a user instruction in a case in which the communication unit is unable to communicate with the object disposed within the range in which the wireless electric power transmission apparatus can transmit wireless electric power.

Further features of the present subject matter will become apparent from the following description of exemplary embodiments with reference to the attached drawings.

BRIEF DESCRIPTION OF THE DRAWINGS

FIGS. 6A to 6E illustrate display examples of a display device.

FIG. 7 is a flowchart illustrating an operation of the electric power reception apparatus.

DETAILED DESCRIPTION

Various exemplary embodiments, features, and aspects of the subject matter will be described in detail below with reference to the drawings.

An exemplary embodiment described hereinafter is directed to achieving both safety and convenience in wireless electric power transmission.

Figure 1:
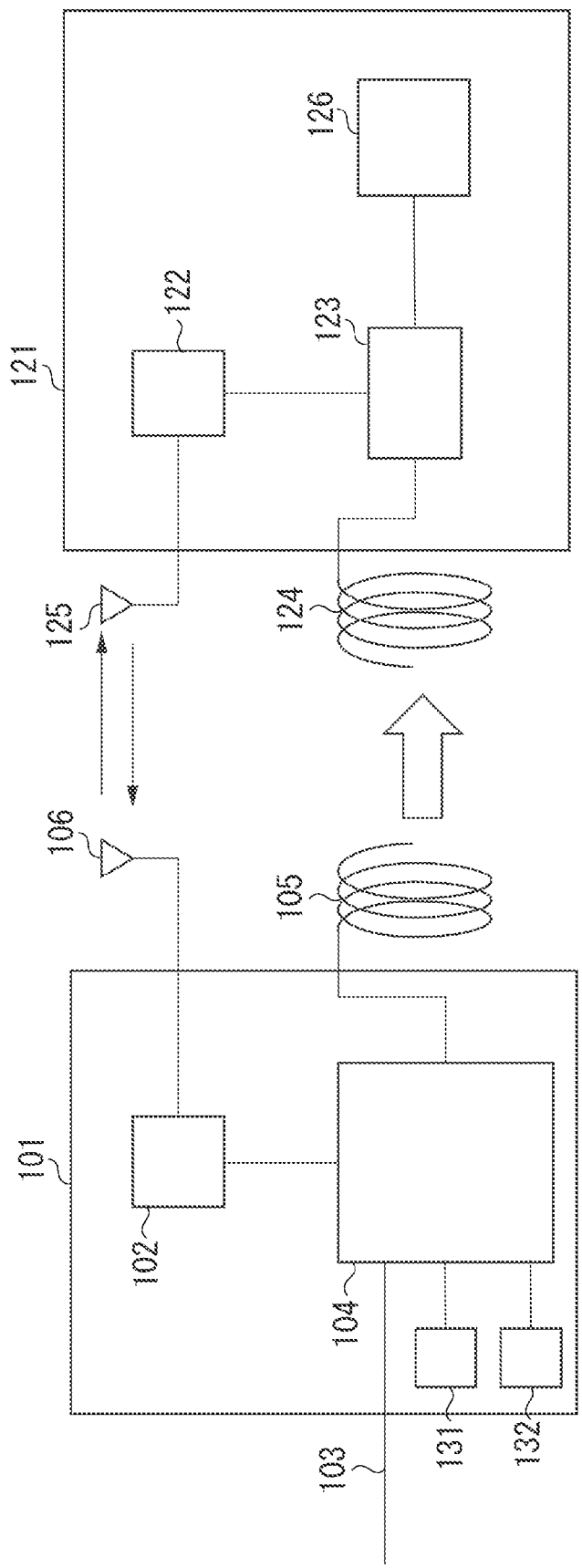
FIG. 1 illustrates a configuration of a wireless electric power transmission system.

An exemplary embodiment will be described with reference to the drawings. FIG. 1 is a block diagram illustrating a contactless electric power transmission/reception system (wireless electric power transmission system) according to the exemplary embodiment. The contactless electric power transmission/reception system includes an electric power transmission apparatus 101, which is a wireless electric power transmission apparatus that transmits electric power, and an electric power reception apparatus 121, which is another wireless electric power transmission apparatus that receives electric power transmitted wirelessly from the electric power transmission apparatus 101.

The electric power transmission (supply) apparatus 101 and the electric power reception apparatus 121 include a communication unit 102 and a communication unit 122, respectively. The communication unit 102 and the communication unit 122 establish communication therebetween to conduct a negotiation and authentication for electric power transmission/reception when electric power is to be transmitted and received wirelessly between the electric power transmission apparatus 101 and the electric power reception apparatus 121. The communication unit 102 and the communication unit 122 perform communication, for example, through a wireless local area network (LAN) that is compliant with Bluetooth (registered trademark) IEEE 802.11 series. The communication unit 102 and the communication unit 122 transmit and receive wireless signals, which are used in the communication, to and from each other via antennas 106 and 125, respectively. The electric power transmission apparatus 101 includes an electric power transmission unit 104, which carries out control related to electric power transmission. The electric power transmission unit 104 converts a direct current or alternative current electric power, which is input through an electric power transmission line 103, to alternate current frequency electric power and transmits the electric power through an antenna 105 provided to wirelessly transmit electric power. A switch for starting electric power transmission 131 is provided on the exterior of the electric power transmission apparatus 101. The switch for staring electric power transmission 131 performs selection between ON/OFF states in accordance with a user operation. When the switch for starting electric power transmission 131 is put in an ON state, the switch for starting electric power transmission 131 sends a signal indicating the ON state to the electric power transmission unit 104. When the switch for starting electric power transmission 131 is put in an OFF state, the switch for starting electric power transmission 104 sends a signal indicating the OFF state to the electric power transmission unit 104.

Figure 5A:
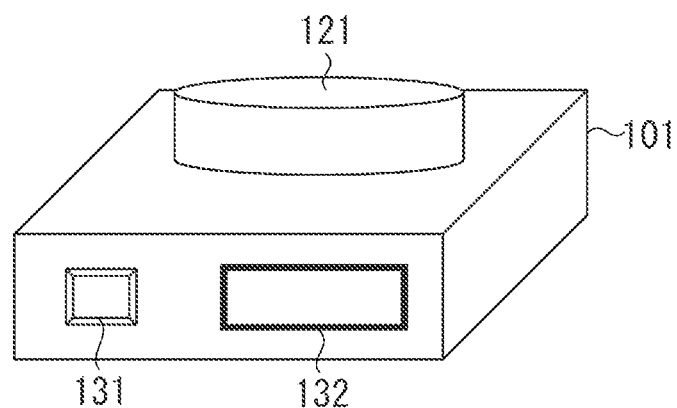
FIGS. 5A and 5B each illustrate an external appearance of the wireless electric power transmission system.
Figure 5B:
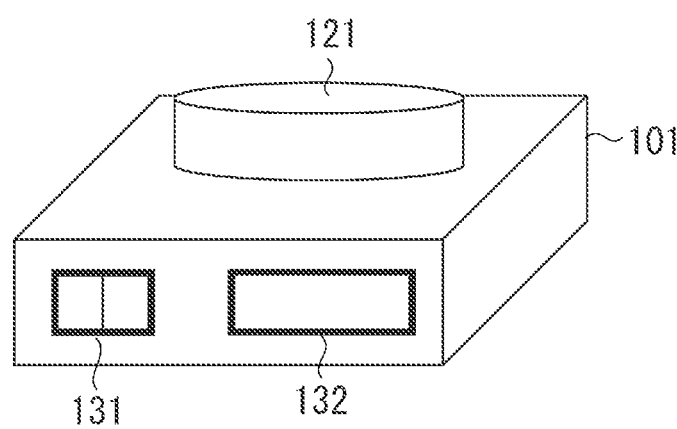

FIGS. 5A and 5B each illustrate an external appearance of the switch for starting electric power transmission 131. FIG. 5A illustrates the electric power reception apparatus 121 placed on the electric power transmission apparatus 101 when the switch for starting electric power transmission 131 is a push button switch. FIG. 5B illustrates the electric power reception apparatus 121 placed on the electric power transmission apparatus 101 when the switch for starting electric power transmission 131 is a slide switch or a seesaw switch. The shape and the function of the switch for starting electric power transmission 131 are not particularly limited as long as the switch for starting electric power transmission 131 can be operated externally.

A display device 132 displays a state of the electric power transmission apparatus 101 and is also provided on the exterior of the electric power transmission apparatus 101 to allow the user to check the displayed content. The display device 132 is a display unit that displays various indications and has a function that enables output of visually recognizable information such as a liquid crystal display (LCD) and light emitting diodes (LEDs) or enables audio output such as a speaker. The display device 132 is provided with a function of outputting at least one of visual information and audio information. In a case in which the display device 132 displays visual information, the display device 132 is provided with a video random access memory (VRAM) that stores image data corresponding to the visual information to be displayed. The display device 132 carries out display control to continue display of the image data stored in the VRAM on an LCD or LEDs.

An electric power reception antenna 124 is provided in the electric power reception apparatus 121. The electric power reception antenna 124 serves to receive electric power transmitted from the electric power transmission apparatus 101 through the electric power transmission antenna 105. The electric power received through the electric power reception antenna 124 is input to an electric power reception unit 123. The electric power reception unit 123 carries out control related to electric power reception. A functional unit 126 performs an operation using the electric power received through the electric power reception unit 123. The functional unit 126, for example, is hardware such as a print engine and a display device if the electric power reception apparatus 121 is a printer. If the electric power reception apparatus 121 is, for example, a digital camera, the functional unit 126 is hardware such as an image sensor, a lens, and a display device for realizing an image capturing function. If the electric power reception apparatus 121 is, for example, a mobile phone, the functional unit 126 is a display device and hardware for realizing a telephone function.

Figure 2:
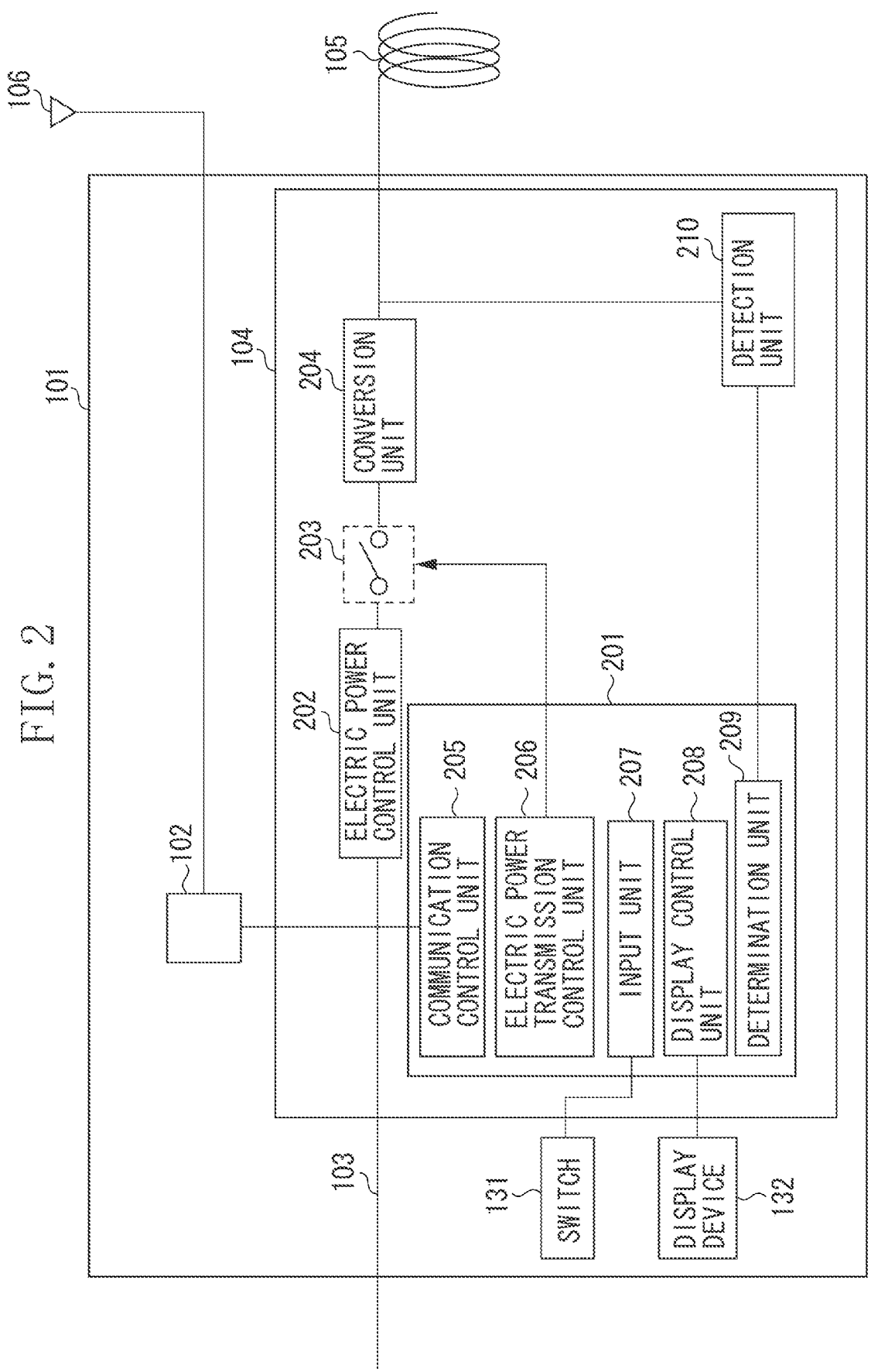
FIG. 2 illustrates a configuration of an electric power transmission apparatus.

FIG. 2 illustrates the configuration of the electric power transmission apparatus 101. The electric power transmission unit 104 includes a control unit 201, an electric power control unit 202, an electric power transmission gate 203, a conversion unit 204, and a detection unit 210. The control unit 201 executes a control program stored in a storage device (not illustrated) that includes a random access memory (RAM) or a read only memory (ROM) to control the entire electric power transmission apparatus 101. The control unit 201 includes, for example, a central processing unit (CPU). In addition, the control unit 201 executes the control program such that the control unit 201 functions as a communication control unit 205, an electric power transmission control unit 206, an input unit 207, a display control unit 208, and a determination unit 209. These units will be described later in detail. The electric power control unit 202 includes a constant voltage power supply. The electric power control unit 202 controls electric power to be transmitted. The electric power transmission gate 203 is a gate, and electric power transmission starts when the electric power transmission gate 203 is brought into an ON (connected) state. The electric power transmission stops when the electric power transmission gate 203 is brought into an OFF (disconnected) state. The electric power transmission control unit 206 of the control unit 201 controls the ON/OFF states of the electric power transmission gate 203.

The detection unit 210 detects a change in an impedance of the electric power transmission antenna 105 and notifies the determination unit 209 of the result of the detection. The determination unit 209 determines whether an object is placed on the electric power transmission apparatus 101 (i.e., within a range in which the electric power transmission apparatus 101 can transmit wireless electric power) based on the result of the detection from the detection unit 210. In addition, the determination unit 209 determines whether an object placed on the electric power transmission apparatus 101 is an object such as a conductor that does not support wireless electric power transmission (hereinafter, referred to as a "foreign object"), based on the presence or absence of communication for a negotiation or authentication established by the communication unit 102. The conversion unit 204 converts a direct current power supply received from the electric power control unit 202 or an alternate current power supply such as a commercial power supply to a frequency for power transmission. The communication control unit 205 controls communication of the communication unit 102 to control communication for conducting a negotiation or authentication for electric power transmission/reception with the electric power reception apparatus 121. The electric power transmission control unit 206 controls the ON/OFF states of the electric power transmission gate 203. The input unit 207 detects the state of the switch for starting electric power transmission 131 provided on the exterior of the electric power transmission apparatus 101. The display control unit 208 controls display in the display device 132 provided on the exterior of the electric power transmission apparatus 101.

The determination unit 209 determines whether a foreign object has been placed on the electric power transmission apparatus 101. If the electric power transmission apparatus 101 starts transmitting electric power while a foreign object such as a conductor is placed thereon, the electric power transmission apparatus 101 may generates heat or the like, leading to a dangerous situation. To prevent such a situation, the electric power transmission apparatus 101 turns on the electric power transmission gate 203 periodically for a short period of time. The determination unit 209 then takes in data (i.e., a change in the impedance of the electric power transmission antenna 105) detected by the detection unit 210 when the electric power transmission gate 203 is turned on, and determines whether the change in the impedance over a predetermined period has exceeded a threshold value. If the determination unit 209 determines that the change in the impedance over the predetermined period has exceeded the threshold value, the determination unit 209 determines that an object is placed on the electric power transmission apparatus 101. In addition, in a case in which a negotiation or authentication for electric power transmission/reception has been conducted with the object placed on the electric power transmission apparatus 101 through the communication using the communication unit 102, the determination unit 209 determines that the aforementioned object is not a foreign object but an electric power reception apparatus that supports wireless electric power transmission. Note that the temporal sequence of the negotiation or the authentication through the communication and the detection of the object placed on the electric power transmission apparatus 101 is not particularly determined. Electric power transmission may be started when the object placed on the electric power transmission apparatus 101 is detected after the negotiation or the authentication through the communication. Alternatively, electric power transmission may be started when the negotiation or the authentication through the communication is conducted after the object placed on the electric power transmission apparatus 101 has been detected. The electric power transmission apparatus 101 turns on the electric power transmission gate 203 to start transmitting electric power in a case in which the object placed on the electric power transmission apparatus 101 is confirmed to be an electric power reception apparatus that supports wireless electric power transmission.

Figure 3:
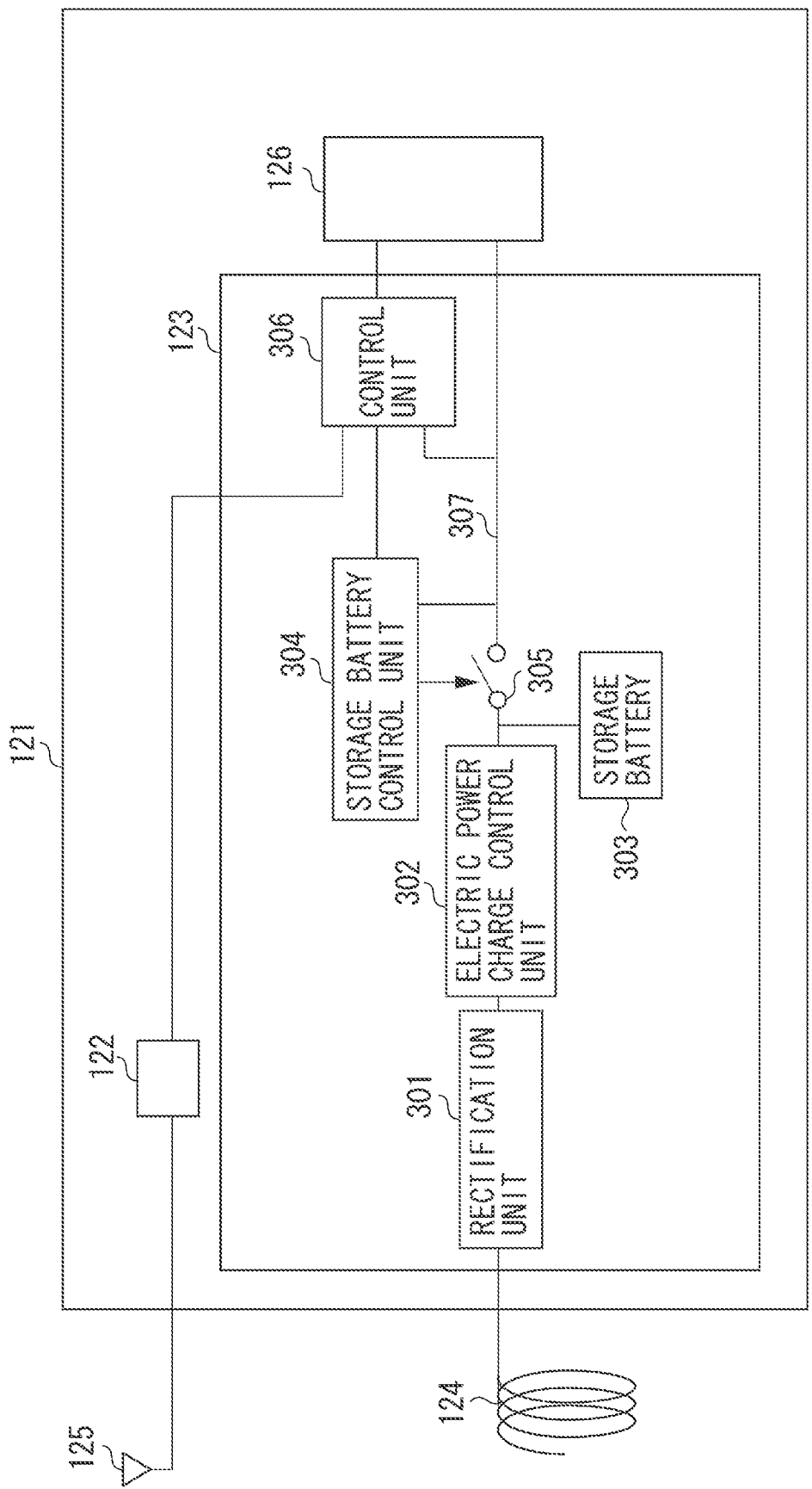
FIG. 3 illustrates a configuration of an electric power reception apparatus.

FIG. 3 illustrates the configuration of the electric power reception apparatus 121. The electric power reception unit 123 includes a rectification unit 301, an electric power charge control unit 302, a storage battery 303, a storage battery control unit 304, an electric power discharge switch 305, a control unit 306, and an electric power transmission line 307. The rectification unit 301 converts electric power received from the electric power transmission apparatus 101 through the electric power reception antenna 124 to a direct current. The electric power charge control unit 302 controls charging of the storage battery 303 provided in the electric power reception apparatus 121. Although the electric power reception apparatus 121 consumes the received electric power in charging the storage battery 303 in the exemplary embodiment, the electric power reception apparatus 121 does not necessarily need to use the received electric power for charging the storage battery 303 and may supply the received electric power directly to the functional unit 126. Alternatively, the electric power reception apparatus 121 may, for example, supply the received electric power preferentially to the communication unit 122. As another alternative, the electric power reception apparatus 121 may supply the received electric power preferentially to a section that is considered to be important in the charging function, and that section may then consume the supplied electric power, or another section having a high priority may consume the electric power. The storage battery control unit 304 monitors an output voltage of the storage battery 303 and controls the storage battery 303 to discharge or stop discharging. The electric power discharge switch 305 controls the storage battery 303 to discharge or stop discharging. While the electric power discharge switch 305 is in an ON (connected) state, electric power is supplied to each piece of hardware. Meanwhile, while the electric power discharge switch 305 is in an OFF (disconnected) state, supply of electric power to each piece of hardware is stopped. The storage battery control unit 304 controls ON or OFF of the electric power discharge switch 305.

The control unit 306 executes a control program stored in a storage device (not illustrated) that includes a RAM or a ROM to control the electric power reception apparatus 121 as a whole. The control unit 306 includes, for example, a CPU. The control unit 306 operates on the electric power supplied from the storage battery 303, and the electric power is supplied through the electric power transmission line 307. The electric power is also supplied to the functional unit 126 through the electric power transmission line 307.

Figure 4:
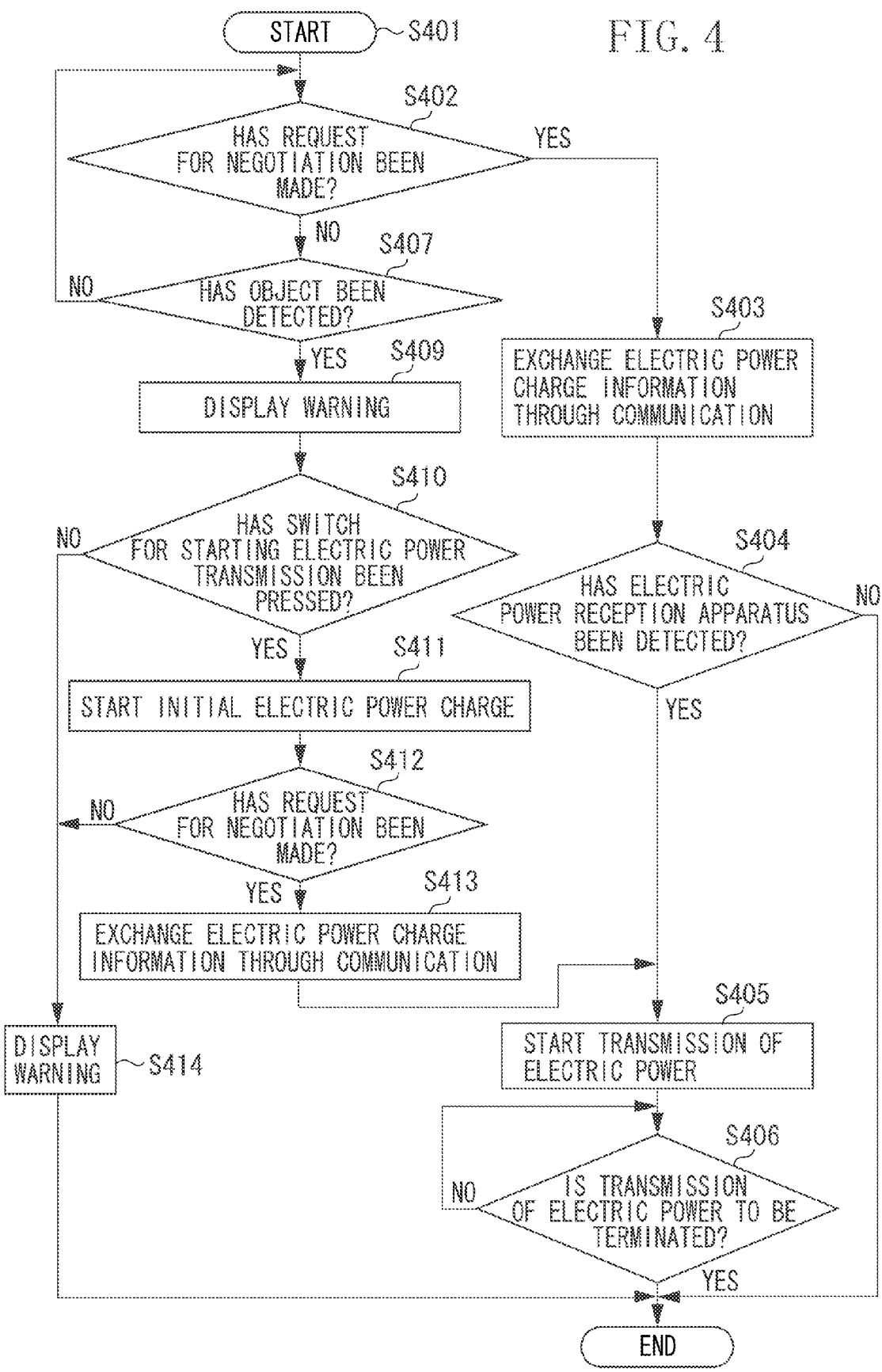
FIG. 4 is a flowchart illustrating an operation of the electric power transmission apparatus.

The operation of the contactless electric power transmission/reception system having the configuration described above will now be described. The operation of the electric power transmission apparatus 101 in the contactless electric power transmission/reception system will be described with reference to the flowchart illustrated in FIG. 4.

In step S401, processing starts in the electric power transmission apparatus 101. In step S402, the control unit 201 determines whether a request for a negotiation or authentication of electric power transmission/reception has been received from an electric power reception apparatus through the communication unit 102. If the communication unit 102 has received a request for a negotiation or authentication of electric power transmission/reception from the electric power reception apparatus (Yes in step S402), in step S403, the communication unit 102 exchanges electric power charge information through communication. The exchanged electric power charge information is information related, for example, to a supported system, an amount of electric power to be transmitted, duration of electric power transmission, an identifier, and authentication information. In step S404, the determination unit 209 then determines whether the electric power reception apparatus has been placed within a range in which the electric power transmission apparatus 101 can transmit electric power, based on a change in the impedance detected by the detection unit 210. Note that, in step S404, the determination may also be made as to whether the apparatus that has communicated with the electric power transmission apparatus 101 in step S403 has been placed within a range in which the electric power transmission apparatus 101 can transmit electric power. For example, the determination unit 209 carries out authentication by determining whether the identifier of the apparatus that has communicated with the electric power transmission apparatus 101 in step S403 is identical to the identifier that is notified through communication based on a change in the impedance (load modulation) when the object has been detected in step S404. Based on the result of the authentication, the determination unit 209 can determine whether the apparatus that has communicated with the electric power transmission apparatus 101 in step S403 is identical to the object placed within the range in which the electric power transmission apparatus 101 can transmit electric power. If it is determined that the object has been detected (Yes in step S404), in step S405, the electric power transmission control unit 206 starts transmitting electric power. The electric power transmission control unit 206 may control the amount of electric power to be transmitted, duration of the electric power transmission, and so on based on the negotiation conducted in step S403. Note that the configuration may be such that the communication in step S403 is carried out after the object is detected in step S404.

In step S406, the electric power transmission control unit 206 determines whether the electric power transmission that has been started is to be terminated. The electric power transmission control unit 206 determines that the electric power transmission is to be terminated in a case in which the electric power transmission control unit 206 has received an indication of the electric power reception apparatus being fully charged, an instruction for terminating electric power supply, or an error notification from the electric power reception apparatus through the communication unit 102. Alternatively, the electric power transmission control unit 206 determines that the electric power transmission is to be terminated in a case in which electric power has been transmitted for the duration set through the negotiation in step S403. If the electric power transmission control unit 206 determines that the electric power transmission is to be terminated (Yes in step S406), the electric power transmission is terminated, and the processing thus ends.

In this manner, the electric power transmission apparatus 101 determines that the object placed thereon is not a foreign object since the negotiation for electric power transmission/reception has been conducted between the communication unit 102 of the electric power transmission apparatus 101 and the communication unit 122 of the electric power reception apparatus 121, and starts the electric power transmission/reception. In the operation described above, the storage battery 303 is at a specified voltage or higher that allows the communication unit 122 of the electric power reception apparatus 121 to operate, and thus the above case corresponds to a normal electric power transmission/reception operation. In such a case, it is not necessary to operate the switch for starting electric power transmission 131.

On the other hand, in a case in which the storage battery control unit 304 determines that the output voltage of the storage battery 303 is below the specified voltage that allows the communication unit 122 of the electric power reception apparatus 121 to operate, the electric power reception apparatus 121 turns off the electric power discharge switch 305. Through such measures, all of the functions of the control unit 306, the communication unit 122, the functional unit 126, and so on of the electric power reception apparatus 121 stop. In this case, even if the electric power reception apparatus 121 is to start an electric power reception operation, a negotiation or authentication for electric power transmission/reception through the communication unit 122 is not possible. Even in such a case (No in step S402), the user of the electric power transmission apparatus 101 and the electric power reception apparatus 121 places the electric power reception apparatus 121 on the electric power transmission apparatus 101 to cause the electric power reception apparatus 121 to receive electric power.

As stated above, the electric power transmission apparatus 101 repeatedly and periodically turns on/off the electric power transmission gate 203 for a short period of time to detect a foreign object. If a negotiation is not conducted through the communication unit 122 (No in step S402) and, in step S407, the determination unit 209 detects an object through the aforementioned periodic operation (Yes in step S407), in step S409, the display control unit 208 displays a warning. Examples of such a warning are illustrated in FIGS. 6A to 6E. A warning is given by displaying "FOREIGN OBJECT HAS BEEN PLACED" in the display device 132 (see FIG. 6A). Alternatively, as illustrated in FIG. 6D, the warning may be a notification indicating that an object other than an electric power reception apparatus has been placed, such as "OBJECT HAS BEEN DETECTED, BUT COMMUNICATION CANNOT BE ESTABLISHED. PLEASE CHECK TO SEE WHETHER THE OBJECT IS FOREIGN OBJECT." In addition, the warning may be a notification to prompt the user to carry out a predetermined operation in a case in which the electric power reception apparatus has a remaining battery capacity that is lower than a predetermined value and is unable to operate a normal electric power reception sequence, such as "IF YOU WANT TO START CHARGING THE APPARATUS PLACED ON THE ELECTRIC POWER TRANSMISSION APPARATUS, PLEASE OPERATE THE SWITCH". Furthermore, the warning may be a notification to prompt the user to remove the foreign object, such as "WHEN YOU OPERATE THE SWITCH, PLEASE REMOVE ANY OBJECT(S) OTHER THAN THE APPARATUS TO BE CHARGED FROM THE ELECTRIC POWER TRANSMISSION APPARATUS."

In step S410, the input unit 207 determines whether the switch for starting electric power transmission 131 has been brought into the ON state. If the switch for starting electric power transmission 131 is not operated for a predetermined period of time after the object has been detected (No in step S410), in step S414, the control unit 201 displays a warning in the display device 132 and terminates the processing. In this case, the configuration may be such that the electric power transmission processing (processing starting from step S401) is not allowed to start unless the determination unit 209 confirms that the object has been removed. The warning displayed in step S414 may, for example, be a warning that prompts the user to remove the object as illustrated in FIG. 6E.

Meanwhile, the user turns on the switch for starting electric power transmission 131 in a case in which the user wants to charge the apparatus placed on the electric power transmission apparatus 101.

Here, the control unit 201 additionally may display a warning in a case in which the switch for starting electric power transmission 131 of the electric power transmission apparatus 101 is pressed. For example, the display control unit 208 displays a message to confirm whether charging of electric power is to be started, as illustrated in FIG. 6B. The electric power transmission control unit 206 starts transmitting electric power in a case in which the switch for starting electric power transmission 131 is pressed again.

If, in step S410, the input unit 207 detects the switch for starting electric power transmission 131 having been pressed (Yes in step S410), in step S411, the electric power transmission control unit 206 starts an initial electric power charge. The electric power transmission control unit 206 turns on the electric power transmission gate 203 to transmit electric power to the electric power reception apparatus 121 through the electric power transmission antenna 105. Note that the electric power in the initial electric power charge carried out in step S411 may be smaller in amount than the electric power transmitted in step S405. Thus, even in a case in which the user accidentally operates the switch for starting electric power transmission 131 while a foreign object is placed on the electric power transmission apparatus 101, heat generation from the foreign object or malfunctioning can be suppressed. Similarly, duration of the initial electric power charge carried out in step S411 may be shorter than the duration of the electric power transmission carried out in step S405. In addition, in the initial electric power charge, the electric power may be transmitted in an electric transmission pattern that has been determined in advance for the initial electric power charge. This allows the electric power reception apparatus to recognize that the given electric power transmission is the initial electric power charge.

The electric power transmission pattern for the initial electric power charge may be determined based, for example, on the ON/OFF cycle of the electric power transmission. Alternatively, the electric power transmission pattern for the initial electric power charge may be determined based, for example, on the value of the transmitted electric power or the electric power transmission time. In a case in which the initial electric power charge has been started, in step S412, the control unit 201 determines whether a request for a negotiation or authentication of electric power transmission/reception has been received from the electric power reception apparatus through the communication unit 102. If, in step S412, communication for the negotiation is not started even when a predetermined period of time has elapsed (No in step S412), in step S414, the control unit 201 determines that the object placed on the electric power transmission apparatus 101 is a foreign object. Thus, the control unit 201 terminates the initial electric power charge and displays a warning. Meanwhile, if, in step S412, communication for the negotiation has been started (Yes in step S412), the control unit 201 determines that the object placed on the electric power transmission apparatus 101 is an electric power reception apparatus. In addition, a case in which the communication for the negotiation has been started in step S412 indicates that the electric power reception apparatus, in which the output voltage of the storage battery was not sufficient to cause the communication unit to operate, has been charged sufficiently through the initial electric power charge so that the output voltage of the storage battery can cause the communication unit to operate.

In step S413, the communication unit 102 exchanges electric power charge information through communication, and in step S405, the electric power transmission control unit 206 starts transmitting electric power based on the exchanged electric power charge information.

Through this, the electric power transmission/reception is enabled even in a situation in which the communication unit 122 is unable to conduct a negotiation for the electric power transmission/reception when the stored battery amount is insufficient to operate the electric power reception apparatus 121.

Although the switch for starting electric power transmission 131 has been assumed to be a push button switch, the switch for starting electric power transmission 131 may be a slide switch or a seesaw switch, and effects to be obtained do not change (FIG. 5B). In such a case, in step S409, "FOREIGN OBJECT HAS BEEN PLACED" and "DO YOU WANT TO START ELECTRIC POWER CHARGE?" are displayed simultaneously, as illustrated in FIG. 6C. In addition, the electric power transmission may be started in a case in which the slide switch or the seesaw switch is operated while the stated messages are displayed.

In a case in which the input unit 207 is unable to detect that the switch for starting electric power transmission 131 has been pressed for a predetermined period of time in step S410, electric power transmission, if in progress, may be stopped. Then, in a case in which it is confirmed that the object has been removed, the electric power transmission may be started in accordance with a user instruction.

Subsequently, the operation of the electric power reception apparatus 121 according to the exemplary embodiment will be described with reference to FIG. 7. In the electric power reception apparatus 121, processing differs depending on the amount of electric power remaining in the storage battery 303. If the amount of electric power remaining in the storage battery 303 is sufficient to cause the communication unit 122 to operate (step S701, Yes in step S702), in step S703, the electric power reception apparatus 121 is set to an electric power reception mode. The electric power reception apparatus 121 may be set to the electric power reception mode through a user instruction. Alternatively, the electric power reception apparatus 121 may be set to the electric power reception mode in response to the detection of electric power transmission or of an electromagnetic field to be used in electric power transmission from the electric power transmission apparatus 101. As another alternative, the electric power reception apparatus 121 may be set to the electric power reception mode in response to the reception of a predetermined signal from the electric power transmission apparatus 101 through the communication unit 122. In a case in which the electric power reception apparatus 121 has been set to the electric power reception mode, in step S704, the communication unit 122 transmits a request for a negotiation or authentication of electric power transmission/reception and the communication unit 102 exchanges electric power charge information through communication. In step S706, the electric power reception unit 123 starts receiving electric power transmitted from the electric power transmission apparatus 101. In step S707, the electric power reception unit 123 determines whether the electric power reception apparatus 121 has been fully charged or an error has occurred. If it is determined that electric power reception is unnecessary, in step S708, the electric power reception unit 123 transmits a supply termination instruction to the electric power transmission apparatus 101. The processing then ends.

Meanwhile, if the amount of electric power remaining in the storage battery 303 is not sufficient to cause the communication unit 122 to operate (No in step S702), in step S709, the electric power reception unit 123 determines whether an initial electric power charge has been started. The determination in step S709 is made as to whether the electric power is transmitted in the electric power transmission pattern that has been determined in advance for the initial electric power charge. When the electric power reception apparatus 121 has been charged to a level that is sufficient for the electric power reception apparatus 121 to operate through the initial electric power charge, the electric power reception apparatus 121 starts supplying electric power to the control unit 306. The control unit 306 then determines whether the electric power transmission is for an initial electric power charge based on the electric power transmission pattern. If it is determined that the electric power transmission is an initial electric power charge, in step S705, the storage battery control unit 304 determines whether the charge amount, or a voltage value, of the storage battery 303 has reached or exceeded a specified voltage. If the storage battery control unit 304 determines that the communication has become possible (Yes in step S705), the processing proceeds to step S704. In step S704, the communication unit 122 starts communication and executes the ordinary electric power charge sequence.

As described thus far, the electric power transmission apparatus can transmit electric power to the electric power reception apparatus even in a case in which the voltage at the storage battery of the electric power reception apparatus falls below the specified voltage and the communication unit becomes unable to transmit or receive information related to the electric power transmission/reception. Thus, a situation in which electric power is transmitted to a foreign object in wireless electric power transmission is suppressed, and even in a case in which the remaining battery capacity of the electric power reception apparatus is low, wireless electric power transmission can be started. In this manner, according to the exemplary embodiment, both safety and convenience in wireless electric power transmission can be achieved.

Although the electric power transmission apparatus has started the initial electric power charge in response to a user operation in a case in which communication for wireless electric power transmission is not carried out when an object is detected in the preceding description, the initial electric power charge may be started automatically without a user instruction. In this case, the configuration may be such that the initial electric power charge is carried out at a transmission electric power value that is restricted to a level at which heat generation does not occur even if the object placed on the electric power transmission apparatus is a foreign object. With this configuration, wireless electric power transmission can be started without a user instruction even if the remaining battery capacity of the electric power reception apparatus is low. In addition, even in such a case, the initial electric power charge is terminated in a case in which the communication does not start when a predetermined period of time elapses after the initial electric power charge has been started. With this configuration, a foreign object can be prevented from generating heat or causing malfunctioning through the electric power transmission.

In the exemplary embodiment described above, the wireless electric power transmission apparatus that carries out wireless electric power transmission restricts the wireless electric power transmission in a case in which the wireless electric power transmission apparatus is unable to establish communication for the wireless electric power transmission with an object that is disposed within a range in which the wireless electric power transmission apparatus can transmit wireless electric power. In addition to the stated function of restricting wireless electric power transmission, the wireless electric power transmission apparatus is provided with a function of carrying out, in response to a user instruction, processing for starting the wireless electric power transmission to the object that is disposed within the range in which the wireless electric power transmission apparatus can transmit wireless electric power. In this manner, according to the exemplary embodiment, both safety and convenience in wireless electric power transmission can be achieved.

In addition, the wireless electric power transmission apparatus according to the exemplary embodiment carries out first wireless electric power transmission that is based on communication and second wireless electric power transmission. The initial electric power charge is an example of the second wireless electric power transmission. The first wireless electric power transmission differs from the second wireless electric power transmission in terms of an electric power value. In addition, the wireless electric power transmission apparatus according to the exemplary embodiment detects an object that is disposed within a range in which the wireless electric power transmission apparatus can transmit wireless electric power. Such detection is carried out based on the impedance of the antenna to be used for wireless electric power transmission. In addition, the wireless electric power transmission apparatus according to the exemplary embodiment displays a warning in response to detecting of an object that is disposed within a range in which the wireless electric power transmission apparatus can transmit wireless electric power. In addition, the wireless electric power transmission apparatus accepts a user instruction in response to detecting of an object that is disposed within a range in which the wireless electric power transmission apparatus can transmit wireless electric power. In a case in which communication for wireless electric power transmission is not started in response to an initial electric power charge, the initial electric power charge is terminated.

Furthermore, in a case in which communication for wireless electric power transmission is started in response to the started initial electric power charge, the wireless electric power transmission apparatus according to the exemplary embodiment starts the first wireless electric power transmission based on the stated communication.

An exemplary embodiment of the present subject matter can also be realized by carrying out the following processing. Specifically, software (program) that realizes the functions of the exemplary embodiment described above is supplied to a system or to an apparatus through a network or in the form of various storage media, and a computer (or a CPU, a microprocessing unit (MPU), or the like) in the system or the apparatus loads and executes the program.

According to the exemplary embodiments of the present subject matter, both safety and convenience in wireless electric power transmission can be improved.

Other Embodiments

Embodiments of the present subject matter can also be realized by a computer of a system or apparatus that reads out and executes computer executable instructions recorded on a storage medium (e.g., non-transitory computer-readable storage medium) to perform the functions of one or more of the above-described embodiment(s) of the present subject matter, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™, a flash memory device, a memory card, and the like.

While the present subject matter has been described with reference to exemplary embodiments, it is to be understood that the subject matter is not limited to the disclosed exemplary embodiments. The scope of the following claims is to be accorded the broadest interpretation so as to encompass all such modifications and equivalent structures and functions.

This application claims the benefit of Japanese Patent Application No. 2013-088495 filed Apr. 19, 2013, which is hereby incorporated by reference herein in its entirety.

What is claimed is:

1. A wireless power transmission apparatus that carries out wireless power transmission, the wireless power transmission apparatus comprising:
   a communication unit configured to carry out communication for a wireless power transmission;
   a restriction unit configured to restrict a wireless power transmission in a case in which the communication unit is unable to communicate with an object disposed within a range in which a wireless power transmission apparatus can transmit wireless power;

a display control unit configured to display an instruction for an operation to start a wireless power transmission to the object while a wireless power transmission to the object is restricted by the restriction unit; and a control unit configured to start a wireless power transmission for charging the object so that the object is able to communicate with the communication unit in response to the operation having been performed by a user after the display control unit displays the instruction for the operation to start the wireless power transmission.

2. The wireless power transmission apparatus according to claim 1, further comprising:

a wireless power transmission unit configured to carry out first wireless power transmission that is based on the communication by the communication unit, and second wireless power transmission that is based on the control unit.

3. The wireless power transmission apparatus according to claim 2, wherein the first wireless power transmission and the second wireless power transmission differ in terms of an electric power value.

4. The wireless power transmission apparatus according to claim 1, further comprising:

a detection unit configured to detect the object disposed within the range in which the wireless power transmission apparatus can transmit wireless power.

5. The wireless power transmission apparatus according to claim 4, wherein the detection unit detects the object disposed within the range in which the wireless power transmission is possible based on an impedance of an antenna used for the wireless power transmission.

6. The wireless power transmission apparatus according to claim 1, further comprising:

a display control unit configured to cause a warning to be displayed in response to detecting of the object disposed within the range in which the wireless power transmission apparatus can transmit wireless power.

7. The wireless power transmission apparatus according to claim 1, further comprising:

an input unit configured to accept the user instruction in response to detecting the object disposed within the range in which the wireless power transmission apparatus can transmit wireless power.

8. The wireless power transmission apparatus according to claim 1, wherein the restriction unit stops the wireless power transmission in a case in which the communication by the communication unit does not start in response to the wireless power transmission started by the control unit.

9. The wireless power transmission apparatus according to claim 2, wherein the wireless power transmission unit starts the first wireless power transmission in a case in which the communication by the communication unit starts in response to the wireless power transmission started by the control unit.

10. A method for controlling a wireless power transmission apparatus that carries out wireless power transmission, the method comprising:

communicating for a wireless power transmission;

restricting a wireless power transmission in a case in which the communicating is unable to establish communication with an object disposed within a range in which a wireless power transmission apparatus can transmit wireless power;

displaying an instruction for an operation to start a wireless power transmission to the object while a wireless power transmission to the object is restricted by the restricting; and performing control to start a wireless power transmission for charging the object so that the object is able to communicate with the communication unit in response to the operation having been performed by a user after the display control unit displays the instruction for the operation to start the wireless power transmission.

11. A storage medium storing a program that, when executed, causes a computer to implement the method according to claim 10.

* * * * *